United States Patent [19]

Holmes

[11] Patent Number: 5,320,794

[45] Date of Patent: Jun. 14, 1994

[54] APPARATUS FOR AND METHOD OF MANUFACTURE OF A TEXTURED VINYL POST

[75] Inventor: Richard M. Holmes, Elkhart, Ind.

[73] Assignee: Delaware Capital Formation, Inc., Apex, N.C.

[21] Appl. No.: 980,331

[22] Filed: Nov. 23, 1992

[51] Int. Cl.⁵ .................. B29C 47/12; B29C 47/86
[52] U.S. Cl. .................. 264/211.21; 264/148; 264/178 R; 264/323; 264/DIG. 69; 425/208; 425/376.1; 425/461; 425/466
[58] Field of Search .................. 264/211.21, 177.19, 264/323, 177.17, 148, 178 R, DIG. 69; 425/466, 461, 376.1, 208, 378.1, 379.1

[56] References Cited

U.S. PATENT DOCUMENTS

| | | | |
|---|---|---|---|
| 2,627,089 | 2/1953 | Norwood | 264/148 |
| 2,702,408 | 2/1955 | Hartland | 264/211.21 |
| 3,518,721 | 7/1970 | Rukas et al. | 264/211.21 |
| 3,676,034 | 7/1972 | Wendricks | 425/376.1 |
| 3,994,661 | 11/1976 | Salemme | 425/461 |
| 4,008,035 | 2/1977 | Korostoff et al. | 425/376.1 |
| 4,187,068 | 2/1980 | Vassar | 425/381 |
| 4,238,435 | 12/1980 | Liebisch | 264/178 R |

FOREIGN PATENT DOCUMENTS

| | | | |
|---|---|---|---|
| 2455639 | 5/1975 | Fed. Rep. of Germany | 264/177.19 |
| 47-13666 | 7/1972 | Japan | 425/208 |

*Primary Examiner*—Jeffery Thurlow
*Attorney, Agent, or Firm*—Allegretti & Witcoff, Ltd.

[57] ABSTRACT

A method of manufacture of a extruded vinyl product to provide a textured stake construction includes an extruder screw and a die having specific structural, and dimensional characteristics and temperature parameters. The extruder screw has a flight depth in the meter zone which is about one half the flight depth in the feed zone and deeper than extruder screws of conventional design. The die includes a frusto-conical section connected to a cylindrical passage. The extruded vinyl stake will have a knobby or textured surface.

4 Claims, 3 Drawing Sheets

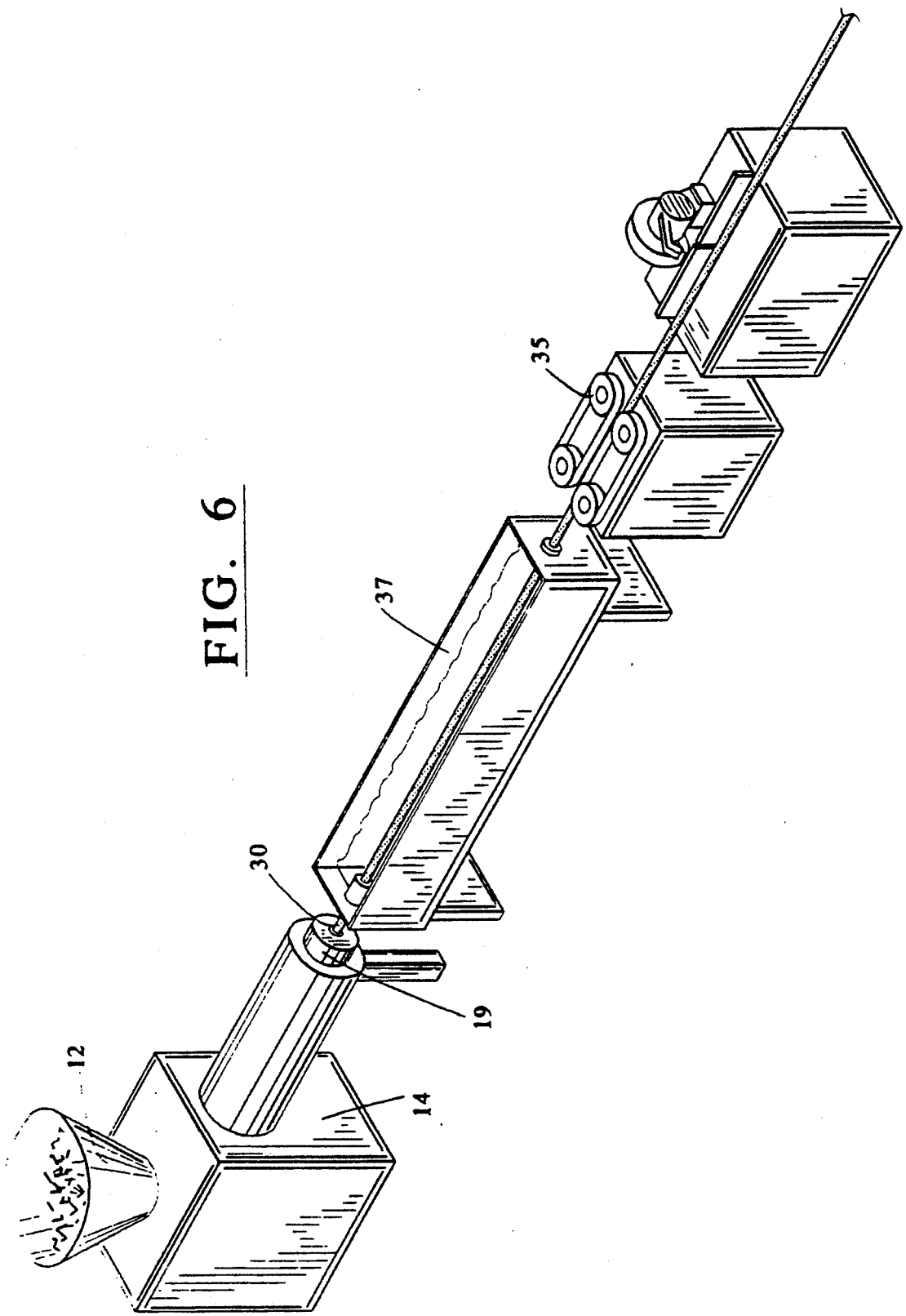

5,320,794

APPARATUS FOR AND METHOD OF MANUFACTURE OF A TEXTURED VINYL POST

BACKGROUND OF THE INVENTION

This invention relates to a method of manufacture of a textured vinyl post which is especially useful as a stake for support of garden plants, for manufacture of trellises, and for other agricultural or decorative purposes.

Heretofore, agricultural posts or stakes have been provided by manufacture of wooden stakes, for example, bamboo stakes. Wooden stakes or slats have also been used to make trellises or other supports for plant life. For example, wooden stakes have been used with wires, which, in turn, support plants. In some circumstances, the wires supported on stakes have been electrified to proscribe the boundary of an enclosure.

It has been found that bamboo or wooden stakes may decay or rot after a period of time and need to be replaced. Of course, metal stakes, such as steel stakes may be utilized. However, steel stakes may rust. Also the cost associated with such metal stakes is significant. Further, metal stakes are conductive and in the event it is desirable to utilize an electrified fence with such stakes, it is necessary to insulate the metal stake from the electrified fence wire.

Thus, a need has developed for an improved, long lasting stake which is made from an insulating material so that it is useful with an electric wire. Also it is desirable to have a decorative stake. It is against this background that the present development was made.

SUMMARY OF THE INVENTION

Briefly, the present invention comprises an improved method for manufacture of a vinyl stake or fence post which has a textured surface so that it may cooperate with and retain wires which are attached thereto, and which also has a decorative appearance. The decorative character of the stake enhances its desirability for use in the manufacture of trellises and other plant support structures.

The stake is manufactured by heating a vinyl composition until it is molten or fluid, and then extruding the molten vinyl through a specially constructed die. The die is specially constructed so that by extrusion of the molten vinyl therethrough the resulting extruded fence post or stake has a textured, decorative configuration which acts to maintain a wire, attached to the stake in a fixed position. The surface of the stake, being irregular, inhibits movement of fencing or wire on the surface of the stake once the wire is wrapped about a specific portion thereof.

The method of the invention involves the utilization of a special extruder screw and die. Specifically, the extruder screw has a helical flight or thread of prescribed depth relative to the root diameter of the screw. The die has a first frusto-conical inlet section which is connected with a generally cylindrical section from which the vinyl is ejected. The ratio of the length of each of the sections and the ratio of the diameters of the sections assures that, upon extrusion of the vinyl through the die, a textured surface will be provided.

Thus, its an object of the invention to provide an improved decorative stake and a method of manufacture of such a stake.

A further object of the present invention is to provide an improved decorative stake which has a patterned surfaced that is cooperative with wire attached thereto.

Yet another object of the invention is to provide an improved stake construction which may be manufactured by means of a continuous extrusion operation.

One further object of the invention is to provide an improved method for manufacture of a agricultural stake construction.

Another object of the invention is to provide an improved die construction for the manufacture of an agricultural stake.

These and other objects, advantages and features of the invention will be set forth in a detailed description which follows.

BRIEF DESCRIPTION OF THE DRAWING

In the detailed description which follows, reference will be made to the drawing comprised of the following Figures:

FIG. 6 is a side plan schematic view of the process line for manufacture of the extruded stake contruction.

DESCRIPTION OF THE PREFERRED EMBODIMENT

Figure 1:
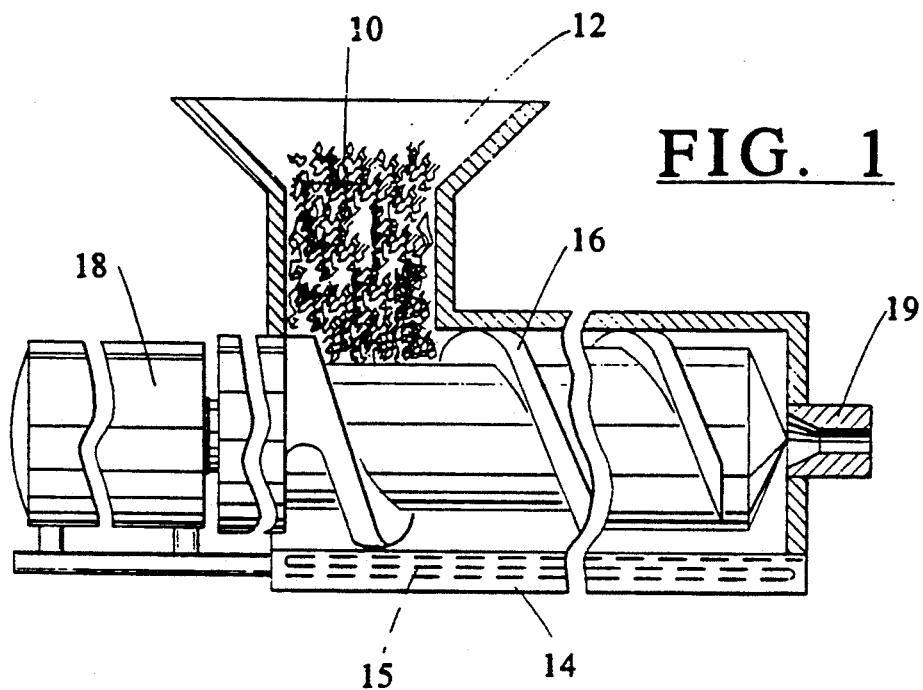
FIG. 1 is a side cross sectional view of a vinyl extrusion apparatus which incorporates an improved die for the manufacture of the improved agricultural stake of the invention.

FIG. 1 depicts a vinyl extrusion apparatus, also known as a screw extrusion apparatus. Vinyl scrap 10 is fed into an entry passage or hopper 12 in a body or housing 14. The body 14 and its contents are heated by means known to those with ordinary skill in the art such as by a heating coil 15. A specially constructed extruder screw 16, operated by a motor 18 feeds the liquified or molten vinyl mixture through a special die 19. In operation the vinyl mixture is maintained in a range of about 150° to 170° C. The vinyl mixture is comprised typically of scrap or recycled materials. Since the vinyl mixture is comprised of recycled polyvinyl chloride, the composition varies depending upon the source of the scrap vinyl.

Figure 5:
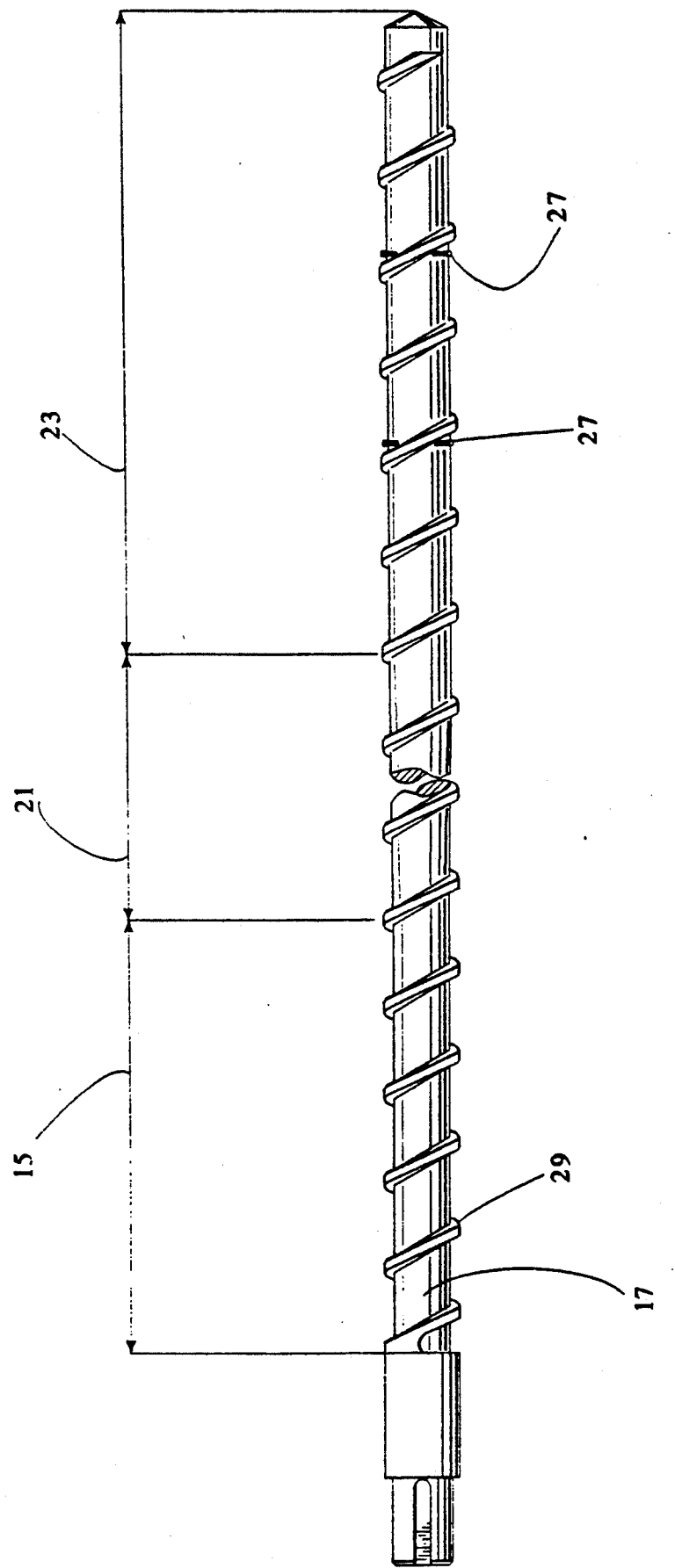
FIG. 5 is a plan view of the extruder screw which is used to extrude the decorative stake depicted in FIG. 3.

The extruder screw 16 is depicted in FIG. 5. Screw 16 has been specially designed to produce a highly textured surface for the extruded post. FIG. 5 comprises a detailed drawing of the screw 16 including the dimensions for a sixty (60) millimeter diameter screw 16 having a center shaft 17. The vinyl mixture first contacts the extruder screw 16 in the feed zone (15 in FIGS. 1 and 5). In this region of the extruder screw 16, the shaft 17 has a smaller root diameter with much deeper flights 29. From the feed zone 15, the extruder screw 16 pushes the vinyl mixture through the transition zone 21 to the meter zone 23. As the material progresses down the shaft 17, the increasing root diameter of the shaft 17 and the relative decreasing depth of flight 29 subjects the vinyl material to increased shearing forces, temperatures, and pressures. In the meter zone 23, the root diameter of shaft 17 is at its maximum size, and the depth of flight 29 at the minimum. The table below lists examples of dimensions for lengths and root diameters of the extruder screw 16 as well as the depth of flight 29 for the three zones 15, 21, 23.

| Zone | Detailed Example | | |
|---|---|---|---|
| | Length (in.) | Root diam. (in.) | Flight (29) depth (in.) |
| Feed (15) | 8.0 | 1.550 | 0.403 |
| Transition (21) | 9.875 | — | — |
| Meter (23) | 36.5 | 1.991 | 0.183 |

Although most apparatus have a tapering extruder screw 16 with minimum flight depth in the meter zone 23, the preferred design for this screw extrusion apparatus has a 0.183 inch flight depth in this zone, which is deeper than the flight depth found generally in extrusion apparatus and is about one half (½) the depth in the feed zone. The provision of a relatively high flight depth in the meter zone yields a textured stake.

To further enhance the production of a textured stake surface, two rows of twenty-four (24) mixing pins 27 are inserted into the screw extruder shaft 17 in the meter zone 23 to further affect the flow of the vinyl material. The twenty-four mixing pins 27 in each set are inserted equidistantly around the entire circumference of the shaft 17 in a plane perpendicular to the axis of the shaft 17 and are spaced at 7 in. and 17 in. from the terminus of shaft 17 nearest the die 19 as shown in FIG. 5. These pins 27 are cylindrically shaped and can range between ⅛" to 3/16" in diameter. The pins extend 0.178 inches above the shaft 17 surface.

The extruder screw 16 provides pressure on the molten vinyl and extrudes the vinyl through the die 19. The die 19 has a special construction which, in combination with the screw 16, insures that the extruded rod includes a patterned surface. Die 19 thus includes a frusto-conical channel 21 which is connected to a passage 23. The frusto-conical channel 21 has an enlarged diameter 25 which connects to a reduced diameter entry 27 to the passage 23. The passage 23 is a generally cylindrical passage. Molten vinyl enters channel 21 and is ultimately extruded from passage 23. The relative ratio of the dimensions of the various component parts forms an important part of the invention. The diameter ($D_1$) of the inlet 25 is about two times the diameter ($D_2$) of the passage 23. The longitudinal dimension ($L_1$) of the frusto-conical channel 21 has a ratio of one to six relative to the axial length ($L_2$) of the cylindrical passage channel 23.

During extrusion, the die 19 is preferably heated to about 170° to 190° to thereby give an extruded post or stake 30 a shiny or glossy surface appearance. The temperature of die 19 thus affects the gloss of the surface of the stake 30. Following is a table which summarizes the dimensional characteristics of a preferred embodiment of the shaft 17 and die 19 as well as the operational characteristics of the mechanism and method which produces the stake:

| DETAILED EXAMPLE | |
|---|---|
| Screw (17) | |
| Length (Total) | 54.375 in. |
| Feed Zone (15) Length | 8.00 in. |
| Root Dia. (Feed Zone) | 1.550 in. |
| Flight Depth (Feed Zone) | 0.403 in. |
| Transition Zone (21) Length | 9.875 in. |
| Meter Zone (23) Length | 36.550 in. |
| Root Dia. (Meter Zone) | 1.991 in. |
| Flight Depth (Meter Zone) | 0.183 in. |
| Flight Diameter | 2.375 in. (60 mm) |
| Frusto conical channel (21) | Preferred Range |
| Maximum Diameter - | Equal to the barrel size of the extruder, i.e. the internal diameter of the housing 14 adjacent inlet 25. |
| Minimum Diameter - | Same as the barrel on inside diameter of body 14 |
| Length - | Optional |
| Vinyl Temperature at Maximum Diameter - 150°–170° C. | |
| Vinyl Temperature at Minimum Diameter - 150°–170° C. | |
| Vinyl Die Temperature - 170°–190° C. | |
| Cylindrical Passage (23) | |
| Diameter - 0.720 in. | |
| Length - 4.275 in. | |
| Vinyl Temperature - 150°–170° | |
| Vinyl Composition - Variable | |
| Rate of Flow of Vinyl Through Passage 23 - 8 ft./min. | |

Example

Referring to FIG. 6, to obtain the textured vinyl posts described herein, a Fuhrer Type-E60K screw extruder apparatus modified as described above but otherwise manufactured in 1978 was used. Vinyl scrap enters the screw extrusion apparatus through opening 12 as depicted in FIGS. 1 and 6, and a ten horsepower (h.p.) engine 18 turns the screw extruder 16 at a rate of 66 revolutions per minute (r.p.m.), extruding the vinyl post from die 19 at a rate of eight (8) feet/min. The vinyl, as it leaves the die 19, is still soft but has the desired texture. It is then pulled, by use of a clamp-type conveyor 35, through a cooling trough 37 filled with cold water and reaches a solidified state by the time it gets to the puller 35. (The trough is 20' long.) Stake 30 then laid in a rack to cool for an additional 30 minutes. When properly operated, the screw extrusion apparatus produces an generally rigid post with an irregular surface characterized by knobs and indentations as depicted in FIG. 3.

The melting characteristics of the vinyl mixture determine the precise operating temperature. If the temperature is too low for a given mixture, the vinyl material will not sufficiently bond together, resulting in extruded posts that have a tendency to break apart. If the temperature is too high, the post's textured appearance decreases becoming smoother as the temperature increases. Therefore, a person skilled in the art varies the body temperature between 150°–170° C. until a well-bonded, textured post is obtained.

Figure 3:
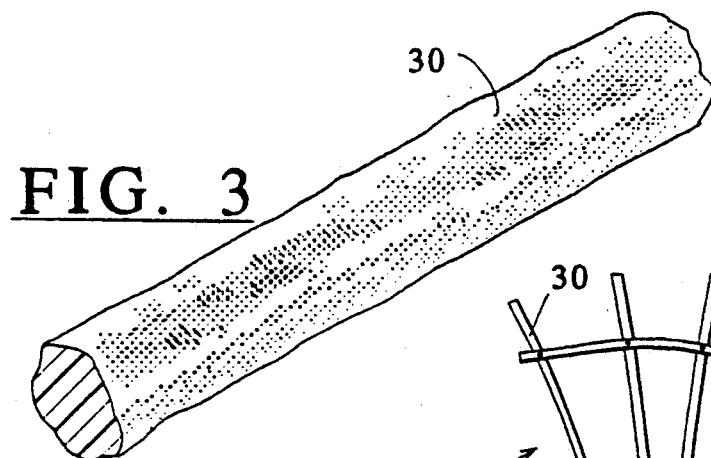
FIG. 3 is a perspective view of an improved agricultural stake which is manufactured in accord with the subject matter of the invention.
Figure 2:
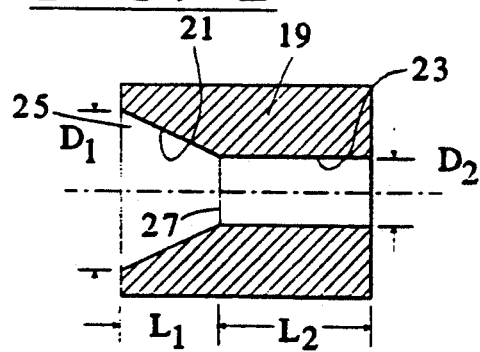
FIG. 2 is an enlarged cross sectional view of the improved die for the manufacture of the agricultural stake of the invention.
Figure 4:
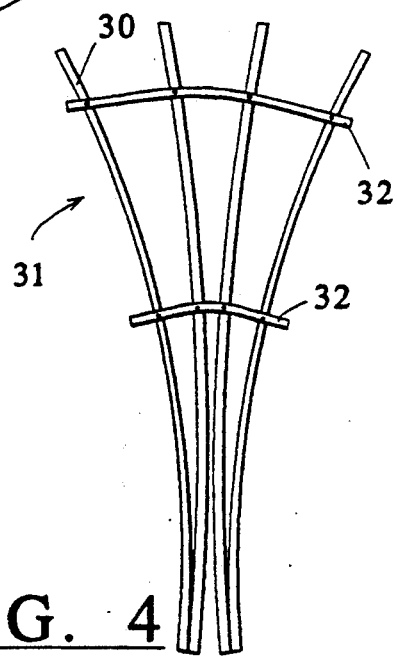
FIG. 4 is a typical trellis construction utilizing an extruded stake contruction of the present invention.

Referring to FIG. 3 there is depicted in a perspective view the resulting type of surface configuration of a stake which is made by the extrusion process described. Because of the particular ratio of the dimensions of screw 16, die 19 and the temperatures of operation of the method in combination with the characteristics of the vinyl, it is possible to produce a stake 30 which has a textured surface. The stake 30 is continuously produced and may be cut to desired lengths and made into various products. For example, a trellis may be fabricated as depicted in FIG. 4. Thus, as shown in FIG. 4 a trellis 31 includes a series of stakes 30 which are joined by cross members 32.

As shown in FIG. 3, the stake 30 has a configuration which comprises of a knobby appearance. Because of the knobby appearance or characteristics of the stake 30, plants can more easily climb on the surface of the stake 30. Additionally, if the stake 30 is used for an electrified fence, the texture or configuration of the surface of the stake eliminates the need of insulators and special holders. That is, the rough or knobby surface acts to prevent sliding of wire up or down the length of the stake. Thus, the stake has an aesthetic, as well as, utilitarian function.

It is possible to vary the dimensions of the screw 16 and die 19, for example, as well as, the temperatures and other features of the invention to still provide a extruded stake having the configuration as shown in FIG. 3. Thus, while there has been set forth a preferred embodiment of the invention, it is to be understood that the invention is to be limited only by the following claims and their equivalents.

What is claimed is:

1. An improved method for manufacture of an extruded, knobby form surface vinyl material post comprising the steps of:
    (a) heating a vinyl material mixture to about 150° C. to 170° C.;
    (b) forcing said mixture by means of a screw extruder through a die in a manner to manipulate the vinyl mixture to form a knobby, roughened, generally cylindrical form surface discharged from the die, said die defining a longitudinal pathway for the vinyl mixture and having an inlet, a frusto-conical channel with a large diameter end and a small diameter end, the large diameter end coincident with the inlet, and a cylindrical passage extending from the small diameter end of the frusto-conical channel through the cylindrical passage wherein the ratio of the longitudinal length of the frusto-conical channel to the longitudinal length of the cylindrical passage is about 1 to 6, and wherein the ratio of the diameter of the cylindrical passage to the large diameter of the frusto-conical channel is about 1 to 2 and wherein the die is heated in the range of 170° to 190°; and
    (c) solidifying the formed post after it exits from the die.

2. The improved method of claim 1 wherein the step of forcing by means of an screw extruder comprises using a screw extruder defined by a generally cylindrical shaft having a longitudinal axis and divided into three (3) adjacent zones; a feed zone, a transition zone and a meter zone, said shaft having a helical thread thereon defining a flight of generally constant maximum diameter and a depth on the shaft in the meter zone which is about one half of that in the feed zone, said flight depth being varied by adjustment of shaft diameter.

3. In apparatus for extrusion of a vinyl material post having a knobby roughened surface, an improved extrusion die comprising, in combination:
    a die body having a vinyl inlet for receipt of heated, fluid vinyl material;
    a frusto-conical channel extending from the inlet, said frusto-conical channel having a large diameter end and a small diameter end separated longitudinally, said large diameter end of the channel coincident with the inlet;
    a generally cylindrical passage extending longitudinally from the small diameter end of the channel and through the die, the ratio of the length of the cylindrical passage to the longitudinal dimension of the channel being about 6 to 1, and the ratio of the large diameter of the inlet to the small diameter of the passage being about 2 to 1.

4. Apparatus for extrusion of a vinyl material post having a textured, knobby form surface comprising, in combination:
    an extrusion housing with an inlet hopper, a generally cylindrical screw extrusion passage defining a feed zone, a transition zone and a meter zone, and die body having a frusto-conical body channel and a connected cylindrical passage at the end of the screw extrusion passage for vinyl flow therethrough;
    a generally cylindrical screw extruder defining a shaft with an outside surface having a variable diameter and with a helical flight along the length thereof on the outside surface, said screw extruder positioned in the screw extrusion passage with one end of the screw extruder terminating adjacent the die body, the diameter of the flight being constant along the length of the screw extruder, the outside diameter of the shaft of the screw extruder increasing in the transition zone from the feed zone to the meter zone, said outside diameter being generally constant in the feed zone and meter zone and defining a flight depth in the feed zone about two times the flight depth in the meter zone; and
    the die body having a frusto conical channel extending longitudinally from the housing passage said die body channel connected to the body passage, the ratio of the length of the longitudinal dimension of the die body passage to the longitudinal dimension of the frusto-conical channel being about 6 to 1, and the frusto-conical channel having a large diameter inlet, and a small diameter outlet to the die body passage with the diameter of the inlet approximately two times the diameter of the outlet.

* * * * *